UNITED STATES PATENT OFFICE.

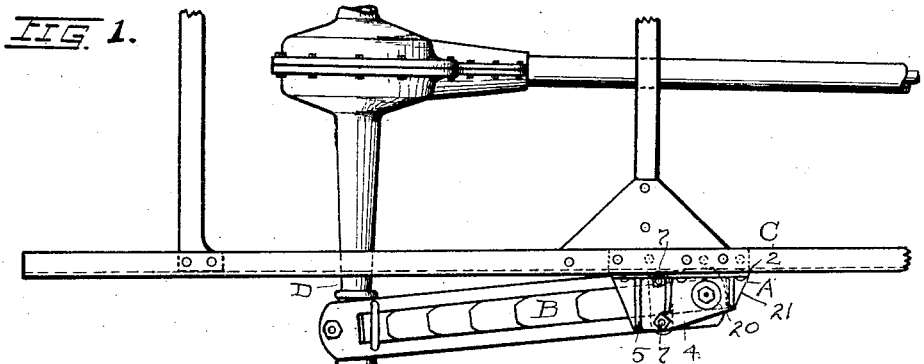

FLOYD C. EWING, OF JEROMESVILLE, OHIO.

BRACKET FOR VEHICLE-SPRINGS.

1,336,829.   Specification of Letters Patent.   Patented Apr. 13, 1920.

Application filed February 21, 1919. Serial No. 278,314.

*To all whom it may concern:*

Be it known that I, FLOYD C. EWING, citizen of the United States, residing at Jeromesville, in the county of Ashland and State of Ohio, have invented certain new and useful Improvements in Brackets for Vehicle-Springs, of which the following is a specification.

This invention relates to brackets for vehicle springs, and the object of the invention is to provide an improved cast metal bracket particularly constructed to support one end of a laminated or leaf vehicle spring in a depending socket or seat opposite a point of suspension for the spring on the same bracket. The invention takes up the end thrust on the spring and relieves the fastening bolts from the strains imparted by such end thrust while in no way impairing the flexibility of the spring. Further, the bolts are less liable to become broken, and if one bolt breaks or becomes loose the remaining bolts will still hold the springs safely and securely. The bracket is also greatly strengthened by the angularly-related walls which form the depending socket or seat for the spring, and the spring is held in place in this socket by a single bolt or clip arranged to bear down upon the top of the spring in contra-position to a clevis or bolt which is adapted to suspend the springs from the bracket.

In the accompanying drawings, Figure 1 is a plan view of a portion of a chassis of an automobile, showing my improved bracket riveted in place thereon. Fig. 2 is a side elevation of the parts shown in Fig. 1. Fig. 3 is an enlarged view in plan of the bracket and a portion of the spring, and Fig. 4 is a side view thereof, while Fig. 5 is a cross section on line 5—5, Fig. 4. Fig. 6 is a plan view of a modified form of the bracket.

My improved bracket A is shown in the present instance as securing a quarter-elliptic laminated spring B in place upon a chassis frame C, but as this is only one form of spring to which the invention is applicable I am not necessarily limited thereto and may use it with a three-quarter-elliptic or any other form of laminated spring where applicable. The mode of securing the spring B to the axle D as shown is also only one of the many ways practised and forms no part of my invention. The invention resides more particularly in the construction of the bracket A, and in the mode of fastening the spring upon the bracket. Thus, the bracket comprises a cast metal body formed with an L-shaped portion 2 adapted to fit and be riveted to the side and bottom walls of the metal frame-work 3. A lateral base or shelf is also formed on the outer side of the vertical wall or flange of the L-shaped portion 2 and several strengthening ribs 5 extend transversely over the top of shelf 4 and unite with the vertical wall. The bottom face of shelf 4 has a flat face 6 near one end thereof against which the upper leaf or lamination of the spring B is clamped by a pair of transversely spaced bolts 7, a strap 8 and nuts 9, or by a single bolt or a clevis or clip of any suitable construction. The bolt heads 10 rest upon the top surface of shelf 4 and the spring is suspended thereby beneath the shelf and between the bolts. The short projecting end of the spring extends into a socket opposite the bottom clamping face 6 of the bracket and a slight space or clearance 11 is provided between the top surface of the spring and the shelf 4, or where a lighter and cheaper bracket of less strength is required I leave an entirely open space as shown in Fig. 6. The socket is formed by a transverse end wall 12 and a longitudinal side wall 13 depending from the bottom side of the bracket and by a horizontal flange and seat 14 cast integral with said walls and extending at substantially right angles to their vertical faces. The end wall 12 forms an abutment for the end of the spring, and the top surface of the seat 14 may be horizontal but is preferably sloped upwardly toward the end wall, and the seat 14 is located diagonally opposite the clamping face 6. A bolt opening 15 is provided approximately in the center of the seat through which the lower end of a single bolt 16 is adapted to extend to fasten the spring in place, and this bolt passes through the laminations of the spring. In the form of bracket shown in Figs. 1 to 5, an opening is also provided in shelf 4 to accommodate a round bushing 18 which is loosely sleeved upon the bolt or the bolt may be enlarged and a shoulder formed thereon in lieu of the bushing to bear down upon the spring when the bolt is tightened by the nut 19 engaged with the bolt at the bottom side of seat 14. The upper end of bolt 16 has a head and flat washer 20 resting upon the bushing or sleeve and there is sufficient clearance between the flat washer 20 and the top surface of the shelf to permit the bolt to clamp the laminations of the spring together and to secure the spring firmly upon the seat. The bolt is thus stayed or supported at both ends to withstand side play of the spring while acting at the same time to press the spring downwardly upon seat 14. In the modified form of bracket shown in Fig. 6, the spring is also adapted to be held to seat 4 by a single bolt or by a clip or clevis but the upper side of the spring is exposed and the upper head end of the bolt is not stayed or supported by shelf 4 which in this instance does not extend to the end wall 12, although I prefer to brace this end wall 12 in that case by forming a rib or second wall 21 obliquely at an angle thereto. This brace 21 is also shown in Figs. 3 and 4.

The means herein for securing the spring in working position imply a spring of the parti-elliptic type, in which the butt of the spring is secured to the horizontal seat 14 beneath the same and to the intermediate or upper seat 6 by means clamping the spring against the bottom thereof.

What I claim is:

1. A bracket for a leaf spring having a side portion with a flat clamping face at its bottom and provided with a seat for the end of the spring diagonally inward from said face and separate means rigidly securing said spring to said clamping face and said seat respectively.

2. A bracket for a parti-elliptic leaf spring, having a side portion with a bottom flange to which the top side of the spring is clamped, and a depending end wall having a horizontal seat for the bottom side of the butt end of the spring and clamping means to fix the spring upon said bracket.

3. A bracket for a vehicle spring of the parti-elliptic type comprising a metal body having separate lateral portions in different horizontal planes and diagonally opposite each other and forming end and intermediate seats for the spring, and separate means to clamp the spring rigidly upon each of said seats.

4. A metal bracket adapted to support a parti-elliptic leaf spring having a flanged portion provided with a depending end wall having a seat for one end of the spring, means securing the spring in suspended position from said flanged portion of the bracket, and means bearing upon the upper face of said spring and adapted to clamp the end thereof down upon said seat.

5. A bracket for a parti-elliptic spring having an angular portion adapted to be affixed rigidly to a frame and a reinforced lateral portion having a bottom clamping face for the upper side of the spring and a depending socket and seat for the end of the spring, and separate means for securing the spring rigidly upon said clamping face and said seat, respectively.

6. A bracket for a parti-elliptic spring having straight walls adapted to be fastened to a frame and diagonally-related seats relatively at one side of said walls for the top and bottom sides respectively of the spring, a clamp adapted to secure the end of the spring upon one of said seats, and separate fastening means adapted to secure the spring to the other of said seats.

7. An angular bracket for a parti-elliptic spring adapted to be rigidly fixed to a frame and having depending end and side walls with a horizontally sloping seat between them for the end of the spring and provided with a separate seating flange for the upper side of the spring, in combination with separate clamping means adapted to secure said spring to said seats respectively.

8. A bracket for a parti-elliptic spring, comprising a body adapted to be secured to a frame and having a ribbed portion provided with bolt openings and side and end depending walls terminating in a horizontal seat for the end of the spring, in combination with suspending means for the spring and a fastening bolt with an enlargement thereon extending through one of said openings in said lateral portion and bearing down upon the spring, and said bolt extending through the end of the spring and horizontal seat.

Signed at Jeromesville, in the county of Ashland and State of Ohio, this 4th day of February, 1919.

FLOYD C. EWING.